United States Patent Office 3,068,286
Patented Dec. 11, 1962

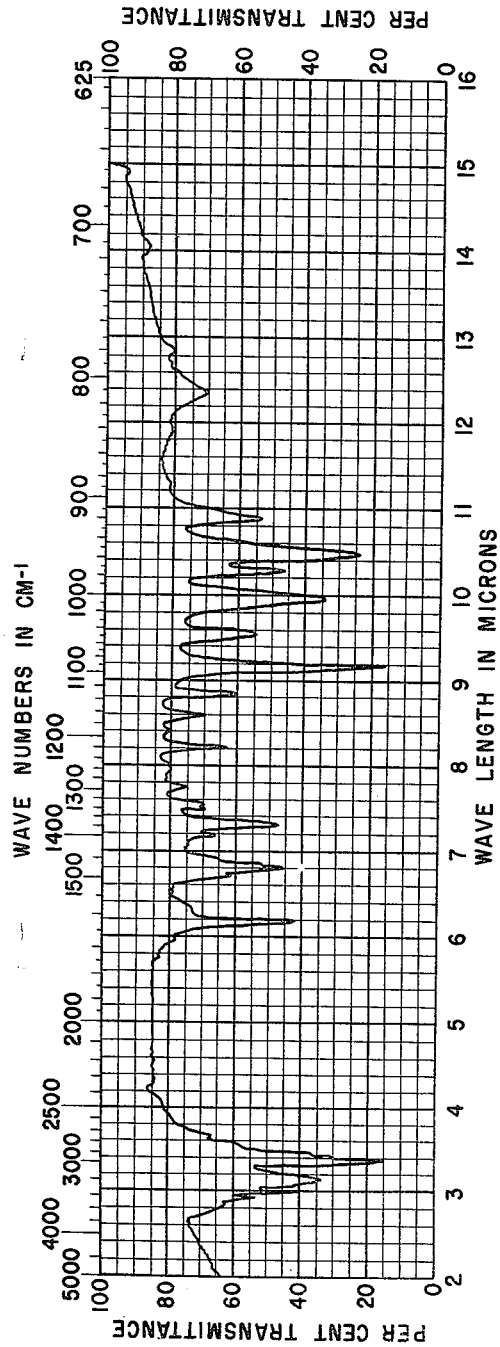
INFRARED SPECTRUM OF AMINOALCOHOL DERIVATIVE OF 4-VINYLCYCLEHEXENE
INVENTOR.
GORDON D. BRINDELL
BY Floyd Trimble
ATTORNEY

3,068,286
METHOD FOR PREPARING AMINO SUBSTITUTED CYCLOHEXANOL
Gordon D. Brindell, Ponca City, Okla., assignor, by mesne assignments, to Cities Service Research and Development Company, New York, N.Y., a corporation of New Jersey
Filed Nov. 14, 1958, Ser. No. 774,057
3 Claims. (Cl. 260—563)

The present invention relates to an amino-substituted ethylcyclohexanol. More particularly, the present invention relates to an aminoalcohol derivative of 4-vinylcyclohexene and a process for preparing the same.

Otto Schmidt et al. in U.S. Patent No. 1,845,563 teach that cyclohexylethanolamine may be obtained by the action of glycolchlorohydrin or ethylene oxide on cyclohexylamine, or by the action of cyclohexanone on ethanolamine, and simultaneous or subsequent catalytic reduction with hydrogen and nickel. The said cyclohexylethanolamine corresponds to the formula:

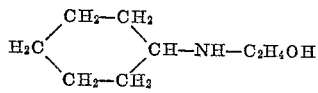

Jack T. Thurston in U.S. Patent No. 2,689,868 teaches the preparation of amines by the reaction of olefin with a cyanogen halide, followed by hydrolysis. The cyanogen halide is used, since the use of hydrogen cyanide is reported to produce a formamide, which must be separated and then further hydrolyzed in order to obtain an amine.

Robert R. Burtner et al. in U.S. Patent No. 2,586,512 teach the preparation of 2-amino-1-cyclohexylethanol corresponding to the formula:

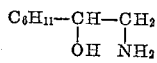

This compound is prepared by the condensation of hexahydrobenzaldehyde with nitromethane to produce a nitroalcohol, which is then reduced to the corresponding aminoalcohol.

It is a primary object of the present invention to provide as a new composition of matter an aminoalcohol derivative of 4-vinylcyclohexene. It is another object of the present invention to provide a process for preparing this novel composition of matter. Additional objects will be apparent from the discussion hereinafter.

The novel compound of this invention is prepared by reacting 4-vinylcyclohexene with hydrogen cyanide and water under strongly acidic conditions and in the presence of a minor amount of an emulsifying agent. This compound is believed to have one of the following formulas:

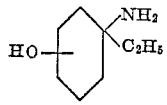

or

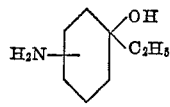

It is to be understood, however, that this is only a hypothesis and I do not intend to be limited thereby.

Before proceeding with specific examples illustrating my invention, it might be well to indicate the nature of the materials required in the process.

The use of the emulsifying agent forms a salient feature of my process. Since the reaction medium is a two-phase system, the reaction would occur only at the interface. Thurston, in the afore-mentioned patent, uses vigorous stirring in order to afford contact of the reactants. The preferred emulsifying agents are non-ionic, an example of which is Triton X–45, which is a condensation product of nonyl phenol and ethylene oxide. Other emulsifying agents may be used and fall within the scope of my invention.

In conducting the process of my invention there should be two or more moles of strong acid for each mole of 4-vinylcyclohexene present. In addition, there should be at least 1.0 mole of water present for each mole of 4-vinylcyclohexene. Additional quantities of water may be used, up to about 15 moles of water per mole of 4-vinylcyclohexene. It follows, quite naturally, that excessive amounts of water will reduce the yield of the desired aminoalcohol.

Any non-oxidizing strong acid is suitable for conducting my process. Examples of preferred acids include the following: sulfuric, phosphoric, and hydrochloric.

The novel compound of my invention has a variety of uses. For example, it may be reacted with ethylene oxide to produce surface active agents. Also, it may be reacted with dicarboxylic acids, such as terephthalic and isophthalic acids, to produce linear polymers. Another use is in the manufacture of quaternary ammonium germicides.

In order to disclose more clearly the nature of the present invention and the advantages thereof, reference will hereinafter be made to certain specific embodiments which illustrate the flexibility of the herein-described process. It should be clearly understood, however, that this is done solely by way of example and is not to be construed as a limitation upon the spirit and scope of the appended claims.

*Example*

In a two-liter, three-necked Morton flask, equipped with a thermometer, stirrer, reflux condenser and addition funnel, were placed 108 grams (1.0 mole) of 4-vinylcyclohexene, 116 milliliters (3.0 moles) of hydrogen cyanide, 54 milliliters (3.0 moles) of water, and 3.5 grams of Triton X–45 as an emulsifying agent. With stirring, 167 milliliters (3.0 moles) of concentrated sulfuric acid was added dropwise over a period of one-half hour, maintaining the reaction temperature between 25 and 30° C. with the aid of an ice bath. At the end of the sulfuric acid addition, the mixture was heated at 60° C. for 1 hour. Four hundred seventy milliliters (26.0 moles) of water was added, and the mixture was heated at 60 to 80° C. for two hours with stirring. The mixture was then heated at 90° C. for 15 hours with stirring. A solution of 480 grams (12.0 moles) of sodium hydroxide in 800 milliliters of water was added, using an ice bath to dissipate the heat of neutralization. This mixture was then heated at reflux for 5 hours. A dark-colored organic layer separated and was isolated. It weighed 162.7 grams and contained some water. This material was distilled in vacuo and gave 57.5 grams of an aminoalcohol of vinylcyclohexene, having a boiling point of 125–130° C. at 9 millimeters of Hg pressure, and 27 grams of vinylcyclohexene diamine. The yield of aminoalcohol based on the vinylcyclohexene charged was 40 percent. The yield of the diamine on the same basis was 19 percent. The aminoalcohol crystallized on standing. Recrystallization from carbon tetrachloride gave white crystals having a melting point of 125–126° C. The infrared spectrum of the aminoalcohol is shown in the figure. A negative iodoform test was obtained on the product, thereby indicating that the compound does not contain the grouping —CHOHCH$_3$ as the side chain. In addition, the following analytical data were obtained:

|  | Found | Calculated for C$_8$H$_{17}$NO |
| --- | --- | --- |
| Percent Carbon | 66.77 | 67.09 |
| Percent Hydrogen | 11.80 | 11.97 |
| Acetic Base No | 398 | 393 |

While particular embodiments of the invention have been described, it will be understood, of course, that the invention is not limited thereto, since many modifications may be made.

The invention having thus been described, what is claimed and desired to be secured by Letters Patent is:

1. The method of preparing an aminoalcohol, said aminoalcohol having the empirical formula C$_8$H$_{17}$NO, a melting point in the range of 125–126° C., a boiling point in the range of 125–130° C. at 9 millimeters of Hg pressure, said aminoalcohol being characterized further in that it gives a negative iodoform test and has an infrared spectrum as shown in the FIGURE, said method comprising reacting about 1 part, on a molar basis, of 4-vinylcyclohexene, hydrogen cyanide, at least about 2 parts of non-oxidizing strong acid selected from the group consisting of sulfuric acid, phosphoric acid, and hydrochloric acid, and at least about 1 part of water in the presence of an emulsifying quantity of a non-ionic emulsifying agent.

2. The method of preparing an aminoalcohol, said aminoalcohol having the empirical formula C$_8$H$_{17}$NO, a melting point in the range of 125–126° C., a boiling point in the range of 125–130° C. at 9 millimeters of Hg pressure, said aminoalcohol being characterized further in that it gives a negative iodoform test and has an infrared spectrum as shown in the FIGURE, said method comprising reacting about 1 part, on a molar basis, of 4-vinylcyclohexene with about 3 parts of hydrogen cyanide and about 3 parts of water in the presence of about 3 parts of a non-oxidizing strong acid selected from the group consisting of sulfuric acid, phosphoric acid, and hydrochloric acid, and at least about 1 part of water in the presence of an emulsifying quantity of a non-ionic emulsifying agent.

3. The method of preparing an aminoalcohol, said aminoalcohol having the empirical formula C$_8$H$_{17}$NO, a melting point in the range of 125–126° C., a boiling point in the range of 125–130° C. at 9 millimeters of Hg pressure, said aminoalcohol being characterized further in that it gives a negative iodoform test and has an infrared spectrum as shown in the FIGURE, said method comprising:

(1) first mixing about 1 part, on a molar basis, of 4-vinylcyclohexene, and 3 parts of hydrogen cyanide, about 3 parts of water, and 3 parts of a non-oxidizing strong acid selected from the group consisting of sulfuric acid, phosphoric acid, and hydrochloric acid, and an emulsifying quantity of a non-ionic emulsifying agent, at a temperature of 25 to 30° C., (2) raising the temperature to about 60° C. and maintaining the temperature at about 60° C. for about one hour, (3) adding water to the reaction mixture, (4) stirring the reaction mixture while maintaining a temperature of about 60 to about 90° C., (5) neutralizing the reaction mixture with strong base, and (6) distilling the reaction mixture to recover therefrom the aminoalcohol product.

References Cited in the file of this patent

UNITED STATES PATENTS 2,632,022    Bortnick              Mar. 17, 1956

OTHER REFERENCES

Mousseron et al.: Compt. rend., vol. 229, pp. 216–218 (1949). (Copy of above in Pat. Off. Sci. Library.)